United States Patent [19]

Tsukagoshi et al.

[11] Patent Number: 5,031,033
[45] Date of Patent: Jul. 9, 1991

[54] PROJECTION TELEVISION APPARATUS

[75] Inventors: Kazuo Tsukagoshi; Hiroshi Kawamura; Hiroshi Tetsuda, all of Nagaokakyo, Japan

[73] Assignee: Mitsubishi Denki Kabushiki Kaisha, Tokyo, Japan

[21] Appl. No.: 480,966

[22] Filed: Feb. 16, 1990

[30] Foreign Application Priority Data

Feb. 20, 1989 [JP] Japan .................................. 1-40631
Dec. 21, 1989 [JP] Japan ................................. 1-333624

[51] Int. Cl.$^5$ .............................................. H04N 5/74
[52] U.S. Cl. ..................................... 358/60; 358/252; 358/64; 358/237; 358/253; 350/417
[58] Field of Search ................. 358/60, 64, 237, 250, 358/252, 253; 313/474, 112; 350/438, 166, 168

[56] References Cited

U.S. PATENT DOCUMENTS

| 4,245,242 | 1/1981 | Treka | 358/252 |
| 4,634,926 | 1/1987 | Vriens et al. | 313/474 |
| 4,642,695 | 2/1987 | Iwasaki | 358/64 |
| 4,683,398 | 7/1987 | Vriens et al. | 313/474 |
| 4,804,884 | 2/1989 | Vriens et al. | 313/474 |
| 4,859,902 | 8/1989 | De Leeuw et al. | 358/253 |
| 4,937,661 | 6/1990 | Van der Voort | 358/60 |

Primary Examiner—John K. Peng
Assistant Examiner—Glen Zurgess

[57] ABSTRACT

In a projection television apparatus, a color selecting device is located on an optical light path passing through a cathode ray tube and a series of projection lenses disposed in front of the cathode ray tube. This color selecting device has a high reflection factor or a high absorption factor to light having a wavelength of at most 520 nm. With this color selecting device, the range of color reproduction can be much more improved, thus causing an increased degree of color purity of green at the central and peripheral areas of the cathode ray tube.

12 Claims, 4 Drawing Sheets

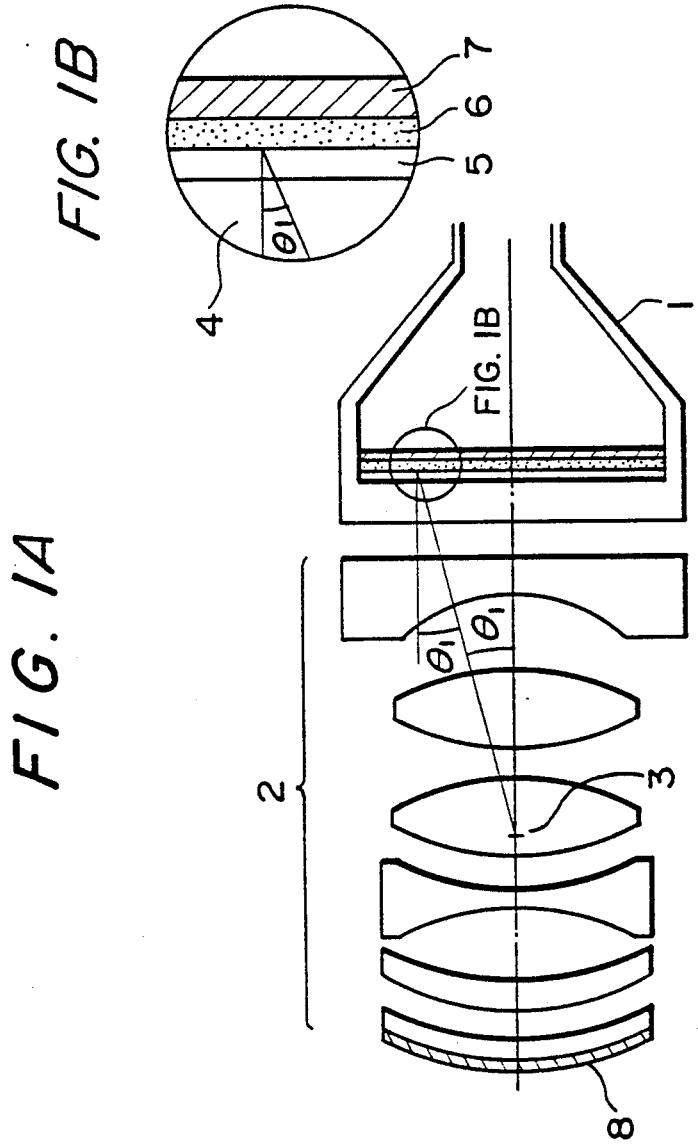

FIG. 6
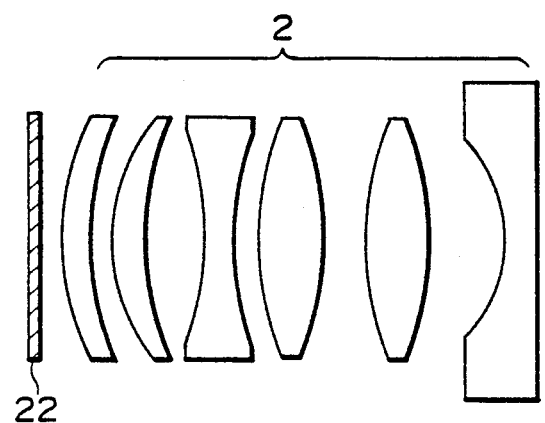
FIG. 7A
PRIOR ART
FIG. 7B
PRIOR ART
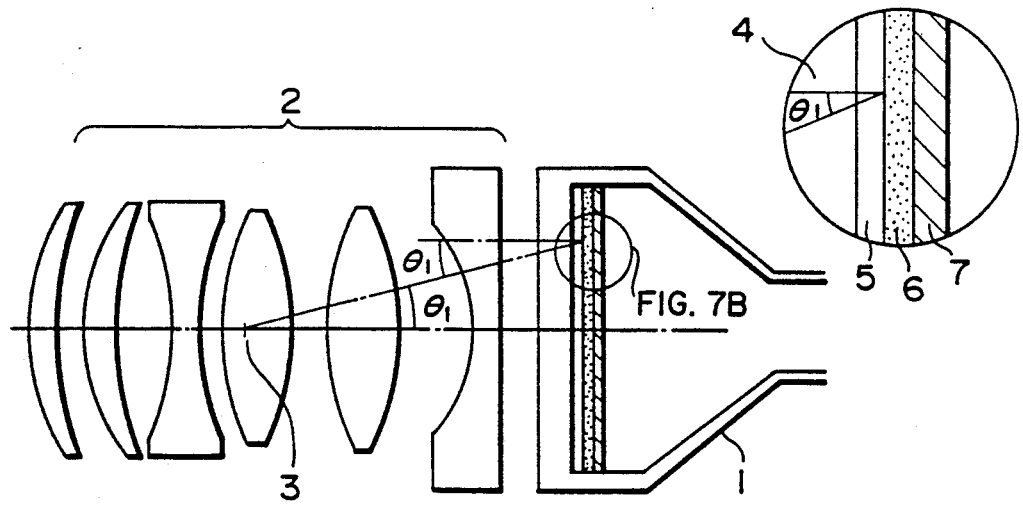

PROJECTION TELEVISION APPARATUS

BACKGROUND OF THE INVENTION

1. Field of the Invention

This invention relates to a projection television apparatus using a green cathode ray tube having an improved color reproduction characteristic.

2. Description of the Related Art

FIG. 7 of the accompanying drawings shows a typical conventional projection television apparatus in which a cathode ray tube equipped with a multilayered interference filter is used. As shown in FIG. 7, the projection television apparatus comprises a cathode ray tube 1, and a series of projecting lenses 2 disposed in front of the cathode ray tube 1. Element 3 designates an incident pupil position of the series of projection lenses 2; 4, a display face plate pane; 5, a multilayered interference filter; 6, a fluorescent material; 7, a vacuum evaporation aluminum film.

The operation of this conventional projection television apparatus will now be described. FIG. 4 shows a characteristic curve 9 of a luminous spectrum of a multilayered interference coating with respect to transmittivity as an electron beam is incident on the fluorescent material 6 coated on the cathode ray tube 1. In view of its life and brightness, any existing fluorescent material to be used in a projection television apparatus has inevitably such luminous spectrum. As shown in FIG. 4, the spectrum includes, in addition to an essential green spectral wavelength of 545 nm, blue-side and red-side spectra. Therefore, as shown in a chromaticity diagram of FIG. 5, only the chromaticity value at a point $G_0 16$ remote from the standard green chromaticity point G13 can be obtained; therefore, color reproduction is possible only within a triangular range 19 indicated by broken lines.

To this end, it is a known practice to place, between the face plate pane 4 and the fluorescent material 6, a multilayered interference filter 5 composed of a plurality of alternately superimposed layers of high and low refractive index materials, and then to determine the transmittivity characteristic of this multilayered interference filter as indicated by the broken lines 11, so that unnecessary light spec having peaks around 600 nm of the light spectrum 9 emitted from the green fluorescent material 6 are reflected. Therefore it is possible to improve the color reproduction up to the chromaticity point $G_1 17$ of FIG. 5. However, as the transmittivity characteristic of the interference filter 5 is determined as indicated by the broken lines 11, it is impossible to reflect the unnecessary light spectrum having a peak at a wavelength of slightly less than 500 nm. As a result, color reproduction can be possible yet in the triangular range 20 indicated by the dash-and-one-dot lines in FIG. 5.

Since the image on the cathode ray tube 1 is disposed at an angle of $\Theta_1$ with respect to the incident pupil 3 which is at the center of the projection lens series 2, the difference l in optical light path between the layers of the multilayered interference filter 5 can be expressed by the following equation:

$l = 2d \cos \Theta_1$ (d: layer thickness).

Consequently, the transmittivity characteristic, in the direction of angle $\Theta$, of the multilayered interference filter 5 will, as indicated by dash-and-one-dot lines 12 in FIG. 4, cause even the necessary green light spectrum to be reflected, thus impairing the color reproduction range.

With this conventional arrangement, partly because the range of color reproduction is inadequate for light from the central areas of the cathode ray tube, and partly because light from the peripheral areas is reflected up to the essential light spectrum, the display color would become blue-emphasized green.

SUMMARY OF THE INVENTION

It is therefore an object of this invention to provide a projection television apparatus which causes color uniformity over the areas from center to periphery of the cathode ray tube and which enables expansion of the color reproduction range.

According to this invention, there is provided a projection television apparatus comprising: a cathode ray tube having a display window, a display screen of a fluorescent material layer disposed on an inner surface of the display window, and a first multilayered interference filter disposed between the fluorescent material layer and the window screen and composed of alternately superimposed high and low refractive index materials; a series of projection lenses arranged in front of the display screen of the cathode ray tube; and a color selecting means disposed in an optical light path composed of the projection lenses and the cathode ray tube and having a high reflection factor or a high absorption factor.

Practically, the color selecting means may be any of: a multilayered interference coating covering a front surface of the foremost one of the series of green projection lenses, or a second multilayered interference filter disposed in front of the foremost green projection lens; a lens colored by mixing therein a metallic material, a pigment and a dye, or by soaking in a coloring liquid to cause infiltration of the liquid to the surface of the lens; or a coolant interposed between the cathode ray tube and the series of green projection lenses and colored by mixing in the coolant a pigment or a dye. The color selecting means has a high reflection factor and a high absorption factor to light having a wavelength of at most 520 nm.

With this arrangement, since the color selecting means has a high reflection characteristic and a high absorption factor to the light having a wavelength of at most 520 nm, it is possible to reflect all the unnecessary light having the peak near 500 nm so that the range of color reproduction is expanded, thus improving the degree of color purity at the central and peripheral areas of the cathode ray tube.

The above and other advantages, features and additional objects of this invention will be manifest to those versed in the art upon making reference to the following detailed description and the accompanying drawings in which several structural embodiments incorporating the principles of this invention are shown by way of illustrative example.

BRIEF DESCRIPTION OF THE DRAWINGS

FIGS. 1 through 3 are schematic views each showing a cathode ray tube and a series of projection lenses of a projection television apparatus embodying this invention;

FIG. 6 is a schematic view showing a series of projection lenses of a projection television apparatus according to another embodiment; and FIG. 7 is a view similar to FIG. 1, showing a conventional projection television apparatus.

DETAILED DESCRIPTION

Figure 2A:
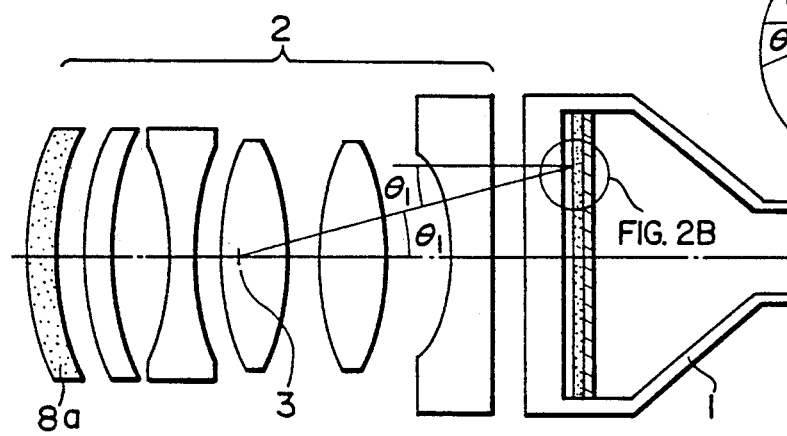

The principles of this invention are particularly useful when embodied in a projection television apparatus such as shown in FIG. 1.

The projection television apparatus generally comprises a cathode ray tube 1, and a series of projecting lenses 2 disposed in front of the cathode ray tube 1. Element 3 designates an incident pupil position of the series of projection lenses 2; 4, a display face plate pane; 5, a multilayered interference filter (hereinafter also called first multilayered interference filter); 6, a fluorescent material; 7, a vacuum evaporation aluminum film.

The first multilayered interference filter 5, like the conventional filter, is composed of a plurality of alternately superimposed layers of high and low refractive index materials, and its transmittivity characteristic is such that unnecessary light spectra having peaks around 600 nm of the light spectra 9 emitted from the green fluorescent material 6 is reflected.

For the most significant feature of this invention, the projection television apparatus is equipped with a color selecting means located on an optical light path. In the embodiment of FIG. 1, the color selecting means is a multilayered interference coating 8 covering a front surface of the foremost one of the green lenses 2. The coating 8 has a high reflection factor with respect to the light having a wavelength of about 520 nm; the transmittivity characteristic of the coating 8 is indicated by dash-and-two-dot lines 10 in FIG. 4.

The coating 8 includes a vacuum evaporation film composed of a plurality of (about 10 to 20) alternately superimposed layers of high and low refractive indexes. The high-refractive-index layers comprise titanium oxide ($TiO_2$) or tantalum oxide ($Ta_2O_5$), for example. The low-refractive-index layers comprise silicon oxide ($SiO_2$) or magnesium fluoride ($MgF_2$), for example.

Figure 4:
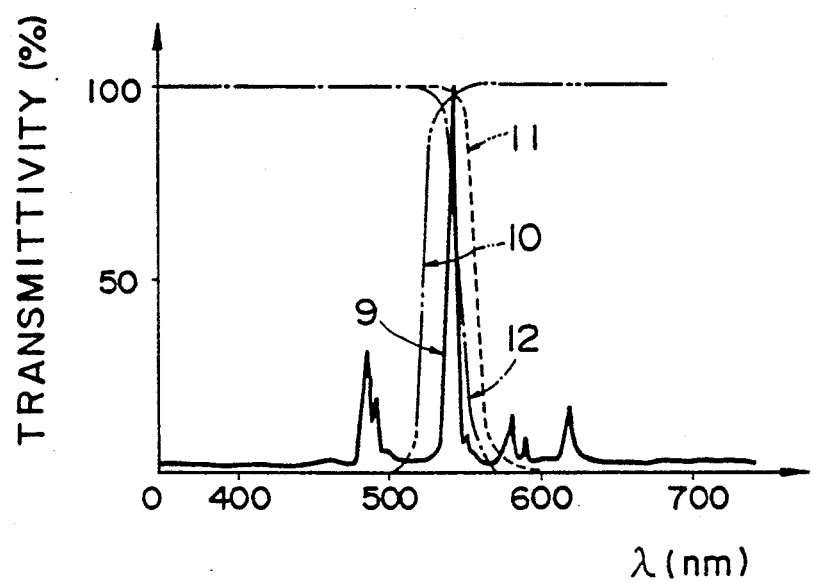
FIG. 4 is a graph showing the luminous spectrum of a green fluorescent material and the transmittivity characteristic of a multilayered interference coating or filter.

In operation, when electron beams are incident on the fluorescent material 6 of the cathode ray tube 1, the light spectrum indicated by the solid lines 9 in FIG. 4 is radiated. Because of the transmittivity characteristic (indicated by the broken lines 11) of the first multilayered interference filter 5, light having peaks near 600 nm is reflected by the filter 5 and is not emitted from the cathode ray tube 1. In the meantime, unnecessary light having peaks at a wavelength of slightly shorter than 500 nm is emitted out of the cathode ray tube 1 to enter the series of projection lenses 2.

Figure 5:
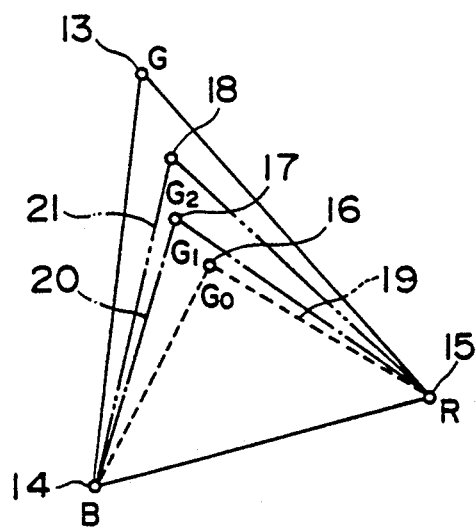
FIG. 5 is a chromaticity diagram showing the range of color reproduction.

Since the multilayered interference coating 8 is determined so as to have the transmittivity characteristic indicated by the dash-and-two-dot lines 10 in FIG. 4, the light having a wavelength of at most 520 nm is reflected by the coating 8 and is not emitted forwardly out of the projection lenses 2. Namely, because the unnecessary partial light of the light emitted from the cathode ray tube 1 is not emitted forwardly out of the projecting lenses 2 and hence is not projected on a screen, it is possible to improve the chromaticity point up to the point $G_2 18$ in FIG. 5, and as a result, the range of color reproduction can be expanded up to a triangular area indicated by dash-and-two-dot lines 21.

Regarding the light of an image on the peripheral areas of the cathode ray tube 1, because the light having a wavelength of at most 520 nm also is not emitted forwardly out of the projection lenses 2, all the light obtained is only the light having a peak wavelength around 545 nm. This is the essential green spectrum, thereby reproducing only green color. This would improve the color purity at the central areas as well as at the peripheral areas.

In the foregoing embodiment, the multilayered interference coating 8 is formed on the front surface of one (the foremost one) of the projection lenses 2. Alternatively, as shown in FIG. 6, the coating 8 may be replaced with a second multilayered interference filter 22 which is disposed in front of the foremost one of the projection lenses 2. The filter 22 has a high reflection factor to the light having a wavelength of about 520 nm.

Figure 2B:
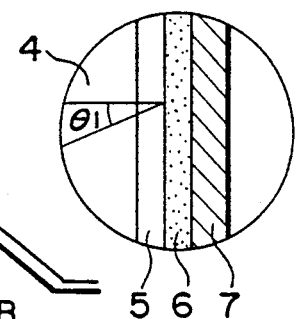

Also, as shown in FIG. 2, the coating 8 may be replaced with a glass or plastic lens 8a colored by mixing therein a metallic material, a pigment and a dye in order to have a transmittivity characteristic to reflect or absorb light having a wave length of at most 520. Alternatively, the lens 8a may be colored by soaking in a coloring liquid to cause an infiltration of the liquid to the surface of the lens 8a.

Figure 3A:
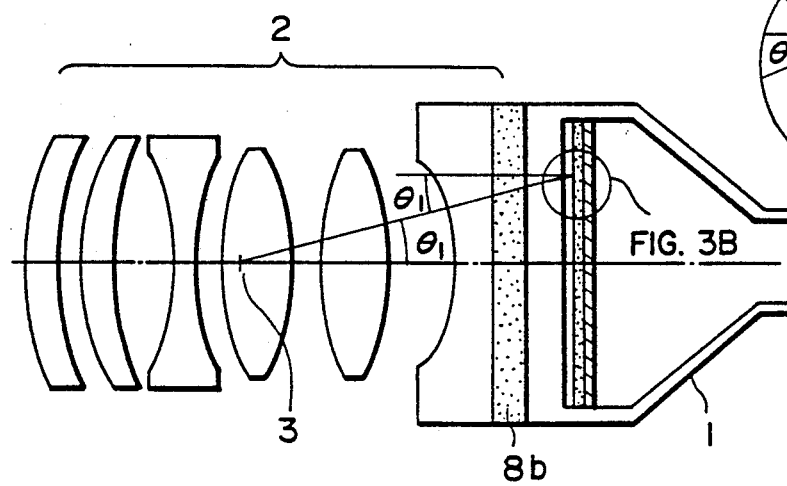
Figure 3B:
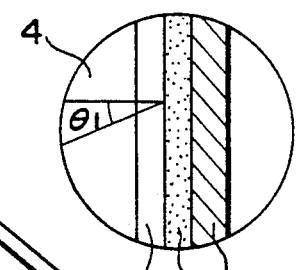

In another alternative form, as shown in FIG. 3, the color selecting means may be a coolant interposed between the cathode ray tube and the series of green projection lenses and colored by mixing in the coolant a pigment or a dye to have the same characteristic.

As a coloring agent for the glass lens, iron oxide or chromium oxide is used as usual. For the plastic lens and the coolant, phthalocyanine pigments or anthraquinone pigments are used as needed.

According to the projection television apparatus of this invention, because a color selecting means having a high reflection factor to the light of a wavelength at most 520 nm is located on an optical light path passing through a series of green projection lenses and a cathode ray tube, the range of color reproduction can be much more improved. Further, though the cathode ray tube is equipped with a multilayered interference filter, it is possible to improve the color purity of green at the central and peripheral areas of the cathode ray tube.

What is claimed is:

1. A projection television apparatus comprising:
   a cathode ray tube including a display window, a display screen of a fluorescent material layer disposed on an inner surface of said display window, and a first multi-layered interference filter disposed between said fluorescent material layer and said display screen, said first multi-layered interference filter composed of alternately superimposed high and low refractive index materials;
   a plurality of green projection lenses sequentially arranged in front of said display screen of said cathode ray tube; and
   color selecting means, forming at least a portion of one of said plurality of green projection lenses, said color selecting means having at least one of a high reflection factor and a high absorption factor, for reflecting all unnecessary light to thereby improve color purity of the cathode ray tube, 2. A projection television apparatus according to claim 1, wherein said color selecting means has a transmittivity characteristic to reflect or absorb light having a wavelength of at most 520nm.

3. A projection television apparatus according to claim 1, wherein said color selecting means is a multi-layered interference coating forming a front portion, covering a front surface of the furthestmost one of said sequentially arranged plurality of green projection lenses from the cathode ray tube.

4. A projection television apparatus according to claim 3, wherein at least one of said first multi-layered interference filter and said multi-layered interference coating includes a vacuum evaporation film composed of a plurality of alternately superimposed layers of different refractive indexes.

5. A projection television apparatus according to claim 4, wherein said vacuum evaporation film is composed of a first material having a high refractive index, and a second material having a low refractive index.

6. A projection television apparatus according to claim 5, wherein said first material and said second material comprise titanium oxide and silicon oxide, respectively.

7. A projection television apparatus according to claim 5, wherein said first material and said second material comprise titanium oxide and silicon oxide, respectively.

8. A projection television apparatus according to claim 2, wherein said color selecting means forms an entire lens, sequentially arranged with the plurality of green projection lenses and colored by mixing therein a metallic material, a pigment and a dye in order to have a transmittivity characteristic to reflect or absorb light having a wavelength of at most 520 nm.

9. A projection television apparatus according to claim 8, wherein said lens is colored by soaking in a coloring liquid to cause infiltration of the liquid to the surface of said lens, in order to have a transmittivity characteristic to reflect or absorb light having a wavelength of at most 520nm.

10. A projection television apparatus comprising:
a cathode ray tube including a display window, a display screen of a fluorescent material layer disposed on an inner surface of the display window, and a first multi-layered interference filter disposed between said fluorescent material layer and the display screen, the first multi-layered interference filter composed of alternately superimposed high and low refractive index materials;
a plurality of green projection lenses arranged in a plurality of sequential linear positions in front of said display screen of said cathode ray tube; and
color selecting means arranged in a predetermined one, of said sequential linear positions, not occupied by one of the plurality of green projection lenses, in front of said display screen of said cathode ray tube, said color selecting means having at least one of a high reflection factor and a high absorption factor for reflecting all unnecessary light to thereby improve color purity of the cathode ray tube.

11. The projection television apparatus of claim 10, wherein the color selecting means is a lens, arranged in the sequentially furthest linear position from the display screen of the cathode ray tube, colored by mixing therein a metallic material, a pigment and a dye in order to achieve a transmittivity characteristic to reflect or absorb light having a wavelength of at most 520 nm.

12. The projection television apparatus of claim 10 wherein the color selecting means is a coolant, arranged at the sequentially nearest linear position to the display screen of the cathode ray tube, colored by mixing a pigment or a dye in the coolant, in order to obtain a transmittivity characteristic to reflect or absorb light having a wavelength of at most 520 nm.

* * * * *